United States Patent [19]

Brierton

[11] Patent Number: 5,533,604
[45] Date of Patent: Jul. 9, 1996

[54] BALL TRANSFER CUBE

[76] Inventor: Dennis M. Brierton, 1678 Langport Dr., Sunnyvale, Calif. 94087

[21] Appl. No.: 540,067

[22] Filed: Oct. 6, 1995

[51] Int. Cl.⁶ .................................................... B65G 13/00
[52] U.S. Cl. .................................................... 193/35 MD
[58] Field of Search .......................... 193/35 MD, 35 R, 193/37; 244/118.1; 414/529, 532

[56] References Cited

U.S. PATENT DOCUMENTS

| | | | |
|---|---|---|---|
| 4,013,282 | 3/1977 | Kaufmann et al. | 193/35 R X |
| 4,784,194 | 11/1988 | Danner | 193/35 MD X |
| 4,871,052 | 10/1989 | Huber | 193/35 MD |
| 5,219,058 | 6/1993 | Sundseth | 193/35 MD |
| 5,390,775 | 2/1995 | Herrick et al. | 193/35 MD X |

*Primary Examiner*—James R. Bidwell
*Attorney, Agent, or Firm*—Thomas E. Schatzel; Law Offices of Thomas E. Schatzel

[57] ABSTRACT

A ball transfer cube includes a prismatically shaped cubed housing, a bearing race, small ball bearings, a main ball bearing and a housing cap for insertion into a prismatically shaped grating used by shipping companies.

24 Claims, 3 Drawing Sheets

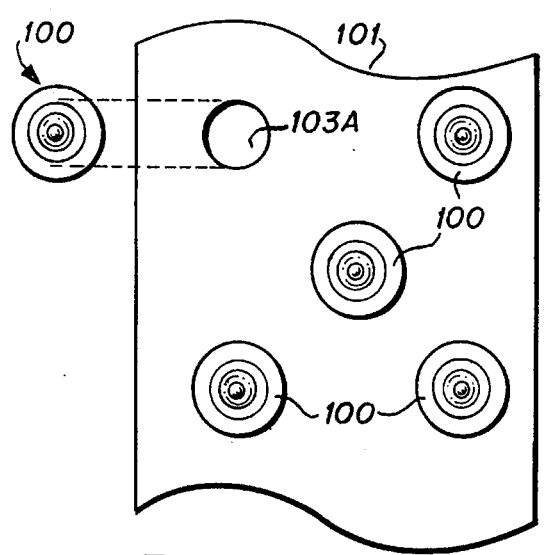
Fig_1A (PRIOR ART)
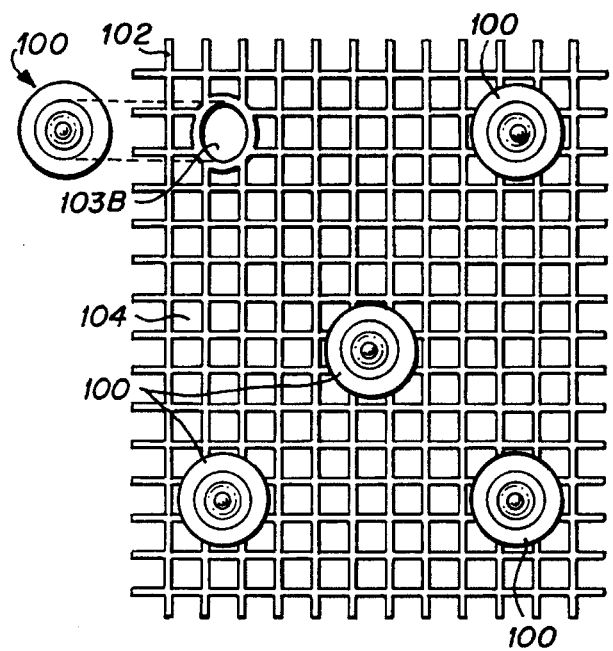
Fig_1C (PRIOR ART)
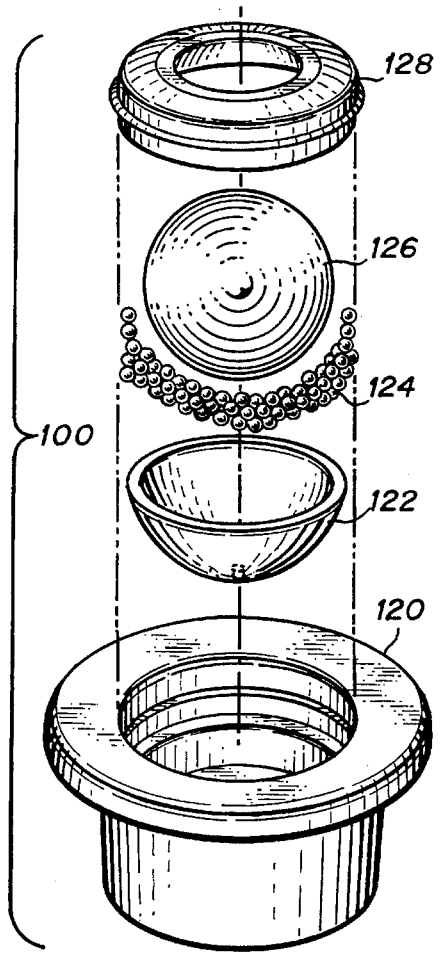
Fig_1B (PRIOR ART)
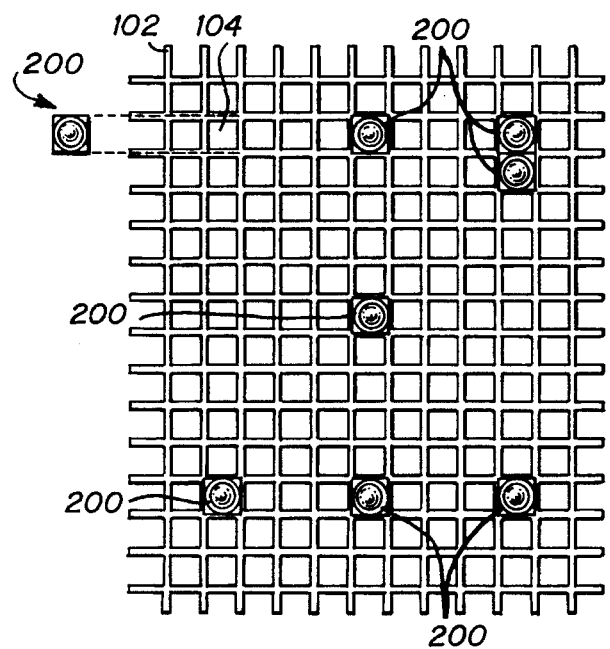
Fig_2

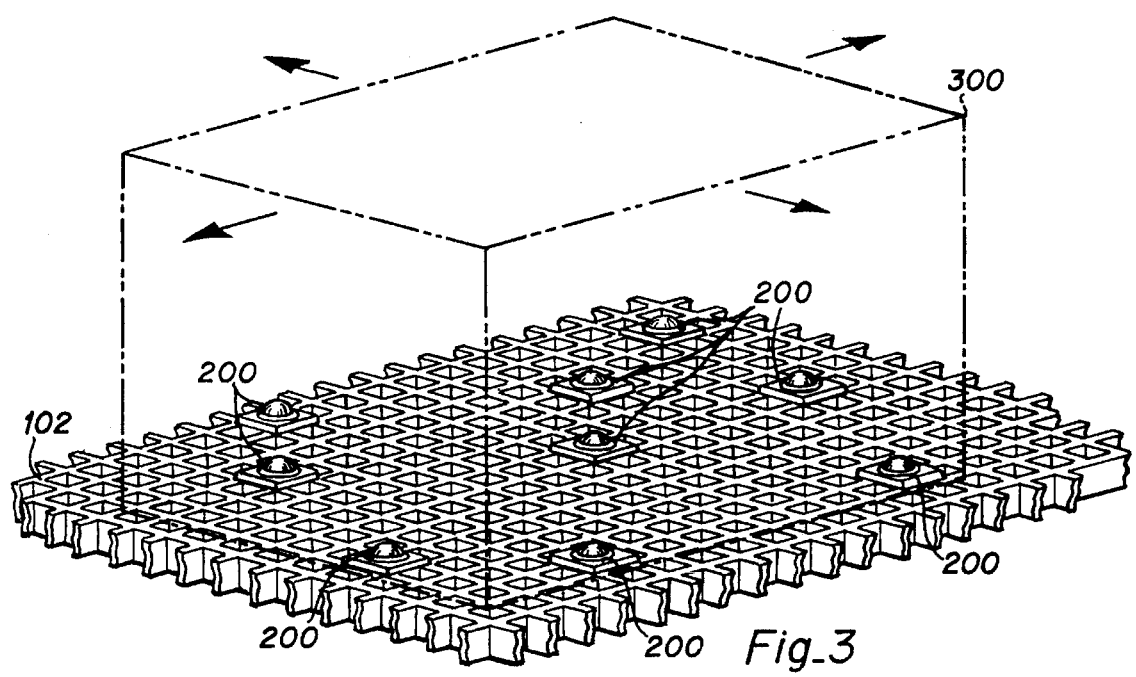
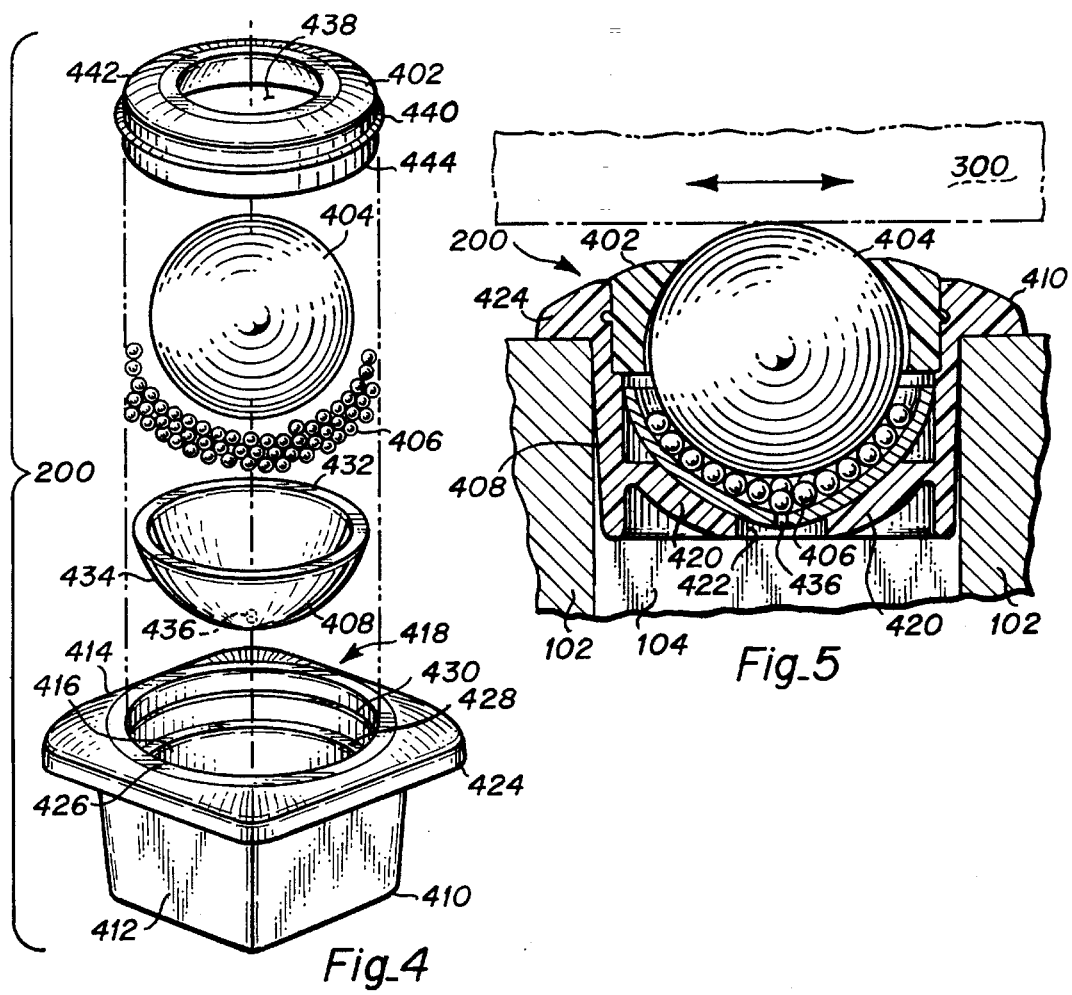

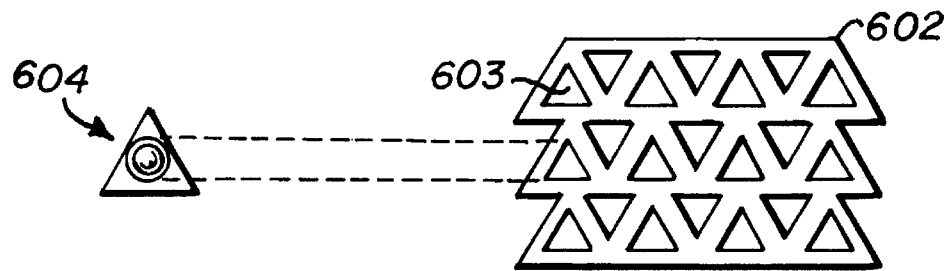
Fig_6A
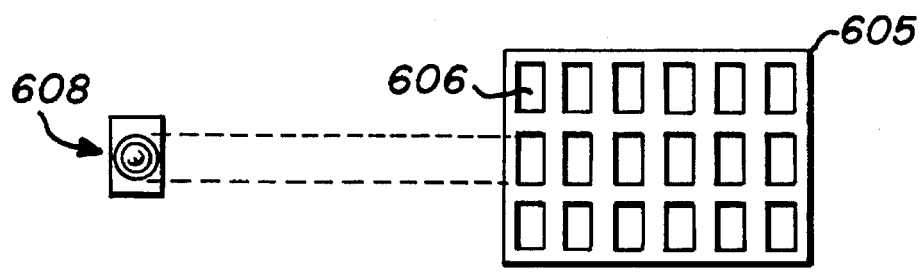
Fig_6B
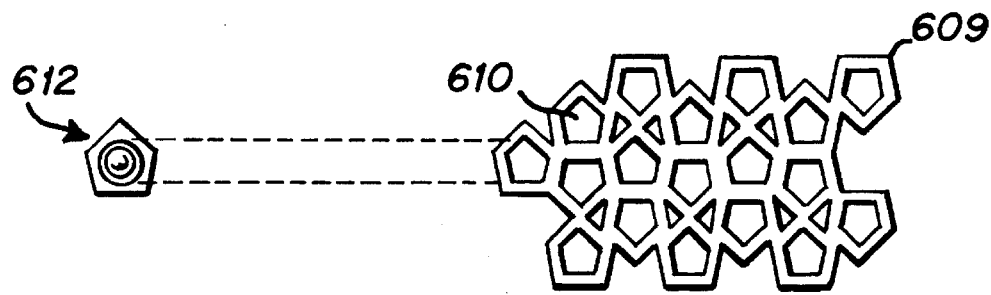
Fig_6C
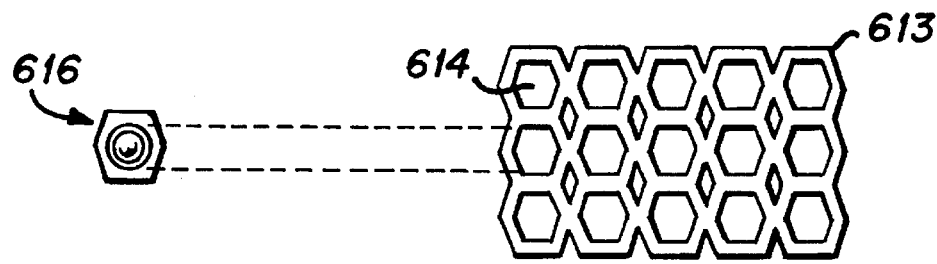
Fig_6D

BALL TRANSFER CUBE

BACKGROUND OF THE INVENTION

1. Invention

This invention relates generally to conveyer systems and more particularly to roller-ball transfer systems including ball transfer mats with inserted ball transfer units.

2. Description of the Prior Art

Referring to FIG. 1A, ball transfer units (BTUs) 100 are used as part of a system to move cargo and material along a surface. A ball transfer unit (BTU) 100 is round and cylindrical in shape having a main ball bearing that supports various loads and provides for movement of a load along a surface. BTUs have generally been installed into a ball transfer mat 101 that is placed upon the surface the load was to move over. A ball transfer mat 101 is generally made of a thick steel decking. A symmetry of holes 103A are drilled into the decking wherever a BTU may be expected to be inserted. The BTUs 100 are typically positioned into predetermined holes such as 103A in the upper surface of the ball transfer mat 101.

Typically, a series of ball transfer mats 101 are symmetrically placed in a warehouse, air cargo bin, truck bed, or other material handling facility. The series of ball transfer mats may be used to move a variety of loads in settings such as air, truck, or maritime cargo forwarding facilities; warehouses; factories; and military bases, munition depots and supply bases. Ball transfer mats 101 having BTUs reduces the requirement of movement of a load by forklift, caster strips or other means that are more likely to damage a cargo container or the cargo itself. A system of ball transfer mats having BTUs also enables cargo to be moved more quickly and efficiently than other methods and reduces the risk of occupational injuries which may occur when forklifts, caster strips or human beings carry a load.

Referring to BTU 100 in FIG. 1B, a ball transfer unit essentially includes a round cylindrical housing 120 with an open mouth that serves as an enclosure for the entire unit, a cup-shaped race 122 that sits snugly inside the housing 120, a number of small diameter ball bearings 124 that sit in the race 122, a main ball bearing 126, and a cap 128 that encompasses the mouth of the housing and snaps into place holding the interior contents 122, 124 and 126 to the housing 120 while still allowing all the ball bearings 126 and 124 to roll freely. The main ball bearing 126 within a BTU is capable of rolling in any direction so that loads such as parcels or air cargo bins may be moved along a surface in any direction when a force is applied.

To perform properly, the main ball bearing 126 in the BTU 100 needs to roll freely in each direction such that loads may be easily pushed along the ball transfer mat. Furthermore, the BTUs 100 need to function indoors as well as outdoors since material handling facilities may exist in either environment. Each BTU within a ball transfer mat may support a load that is relatively light—less than twenty-five pounds—such as a box of semiconductor chips or it may support a full air cargo container weighing more than fifteen-thousand pounds. It is desirable that BTUs be made of noncorrosive materials that are able to withstand anticipated climate and environmental corrosive elements, such as rain, mud, dirt, dust, heat, snow, freezing temperatures, salt and anti-freeze chemicals that may be applied to streets or airport runways during snow storms. It also desirable that a BTU be manufactured using materials that can withstand the weight of anticipated loads.

Previously, all components 120–128 of the BTUs were manufactured out of metal such as steel or aluminum. The material handling industry believed that metal components were necessary in order for a BTU to have the structural strength needed to handle heavy loads. These metal components of the BTUs are often plated with zinc or another similar material in order to resist corrosion. While this plating process adds to the cost and labor needed to manufacture a BTU it does somewhat protect a metal BTU and extend its useful life. However, the plating process involves the use of some toxic chemicals that should be carefully handled.

In order to reduce the cost of a BTU, the material used to manufacture the cap 128 of the BTU was changed from a plated metal to a plastic. It was understood that the plastic would be sufficient to keep the BTU 100 assembly together.

Referring to FIG. 1B, the shape of the housing 120 is cylindrical. This shape has persisted in the material handling industries because BTU mats 101 are fitted with round holes of a fixed dimension. Furthermore the holes 103A are located in predetermined positions based upon the loads that are expected to be supported. The cylindrical shape of the BTU and its metal construction has limited the effective use of BTUs. Also, purchasing ball transfer mats having a number of BTUs is very costly. Also, moving cargo with hand trucks or forklifts may be less efficient. Purchasing costs are of a particularly concern to small businesses, medium businesses, government facilities with small budgets, third world and developing countries. It is desirable to reduce the purchase costs of a system of BTUs by retrofitting existing facilities.

Attempts have been made to adapt or retrofit the prior art BTU 100 to other settings but these attempts have proven costly, inefficient, and have sometimes damaged equipment. For example, consider a material handling facility that currently has no ball transfer mats that could contain BTUs and which presently uses hand trucks or forklifts. Often where hand trucks and forklifts are used, a grating system on the floor of the material handling facility is present. The grating system typically includes a series of metal grates. Each metal grate may be comprised of a number of individual polygonal shaped openings such as the square openings or holes 104 illustrated by the grating 102 in FIG. 1C. These openings or holes 104 are generally not large enough to accommodate the circular shaped or cylindrical BTU 100. The lower outer portion of the cylindrical housing 120 for the BTU is approximately one and eight-tenths inches in diameter. The typical square grating such as illustrated by FIG. 1C is a two inch by two inch square having a square opening or hole 104 that measures one and three-fourths inches by one and three-fourths inches. Thus, the diameter of the cylindrical housing 120 of the prior art BTU 100 exceeds the hole dimension 104. The individual bar thickness is typically one-fourth of an inch while the depth of the grating is typically one to two inches. It is desirable to insert a BTU into such a grating in a symmetric fashion every eight to ten inches from center to center. Sometimes it is desirable to place two BTUs next to one another in order to share the load at that point. In order to insert or retrofit the standard circular shaped or cylindrical BTU 100, the square holes 104 are first crudely expanded or wallowed out with a tool such as a pry bar. If the resultant circular hole 103B is too large, the BTU 100 may work its way out of the hole 103B. If the resultant circular hole 103B is too small, the BTU 100 may be squeezed and cause failure or a reduced life span in the BTU 100. Expanding the hole in size to the circular hole 103B generally prohibits the placing of another BTU beside the BTU 100 because the holes surrounding 103B have been reduced in size.

The use of the prior art BTU 100 in retrofitting a grating system causes a number of other problems. First, it is time consuming for workers to widen each hole 103B. Second, widening of a hole such as 104 distorts the grating itself and threatens the structural integrity of the grating and the carrying capacity of large loads. Third, because the widening of each opening is crudely performed, it is not uniform and thus is inherently incompatible with the circular shaped or cylindrical BTU. Furthermore, the BTU's housing and internal race can often get distorted by an imperfect fit. Fourth, the structural nature of the metal BTU does not afford an even distribution of weight to the sides of the grating hole 103B, resulting in uneven stress and distortion to the grating and the BTU. Lastly, the removal of a failed BTU from the grating at the end of its useful life or upon malfunction requires additional tool-work which may further damage the grating and the failed BTU. Also, where metal BTUs are retrofitted into a metal grating, it has been discovered that the movement of cargo creates a high volume of noise. As a result, workers in such facilities must wear hearing protection in order to avoid the risk of injuring their hearing.

Another problem associated with the prior art BTU 100 is that it has a limited useful life. Typically a metal BTU may have a useful life between six and twenty four months. At the end of a BTU's life, one can either dispose of it or have it rebuilt. If BTUs are to be disposed, one must arrange to have failed BTUs removed, gathered up, and disposed of in a waste landfill or other appropriate disposal cite. In order to rebuild BTUs, the failed BTUs are ordinarily shipped to a rebuilder. Usually a user waits until a sufficient number of BTUs have failed before sending them off to be rebuilt. Thus the user must often wait and store failed BTUs and purchase new BTUs in the mean time. It is desirable to exceed the mean time between failures of prior art BTUs.

In the case that BTUs are to be disposed of none of the material within the components are recycled which imposes a burden on landfills. If the BTUs are rebuilt, some of the components will be reused but others are defective and are replaced with new counterparts. Defective components are generally not recycled because of the difficulty and cost of doing so. It is desirable to make more of the components recyclable.

SUMMARY OF THE INVENTION

It is an object of the present invention to provide ball transfer cubes (BTCs) that are insertable into a grating.

Another object of the present invention is to provide BTCs that are insertable into a grating side by side in order to carry larger loads.

Another object of the present invention is to make a transfer system capable of withstanding cold climatic conditions.

Another object of the present invention is to provide BTCs having increased mean time between failures.

A still further object of the present invention is to provide BTCs capable of being manufactured with components using recyclable materials.

Briefly, in a preferred embodiment of the present invention, a ball transfer cube (BTC) includes a prismatic shaped housing, a bearing cup, small ball bearings, a main ball bearing and a housing cap. The ball transfer cube is designed such that it may be easily inserted into a square shaped or cuboid grating used by shipping companies without altering or damaging the grating. Other grating shapes such as triangular, rectangular, pentagonal, and hexagonal may be accommodated by modifying the outer lateral surfaces of the ball transfer cube housing. Stainless steel is preferably used in the manufacture of metallic ball transfer cubes. However, strong plastics may be used in the manufacture of various components. Plastic components increase the life-span, reduce noise, lower cost, and are more easily recyclable. Furthermore the outer portion of a plastic housing for the ball transfer cube may be more readily molded into the various types of grating encountered.

An advantage of the present invention is that a user is able to insert a ball transfer cube into a grating without modifying the holes in the grating.

Another advantage of the present invention is that ball transfer cubes may be inserted into adjacent holes within a grating in order to carry larger loads.

Another advantage of the ball transfer cube of the present invention is that it makes a transfer system more capable of withstanding cold outdoor climatic conditions.

Another advantage of the ball transfer cube of the present invention is that the mean time between failures is increased.

A still further advantage of the ball transfer cube of the present invention is that it can be manufactured with components of recyclable materials.

These and other objects and advantages of the present invention will no doubt become obvious to those of ordinary skill in the art after having read the following detailed description of the preferred embodiments which are illustrated in the various drawing figures.

IN THE DRAWINGS

FIG. 1A illustrates a ball transfer mat containing several prior art ball transfer units (BTUs);

FIG. 1B illustrates the components of a disassembled prior art ball transfer unit (BTU);

FIG. 1C illustrates a square grating having expanded holes in order to install several of the prior art ball transfer units (BTUs);

FIG. 2 illustrates several square shaped or cuboid ball transfer cubes (BTCs) of the present invention and a square grating into which it may be inserted;

FIG. 3 illustrates a load being carried by several ball transfer cubes (BTCs) of the present invention;

FIG. 4 illustrates the components of a disassembled ball transfer cube (BTC);

FIG. 5 illustrates a cross-sectional view of an assembled ball transfer cube (BTC);

FIG. 6A illustrates a triangular shaped or trigonal prism ball transfer cube (BTC) and the triangular grating into which it may be inserted;

FIG. 6B illustrates a rectangular shaped or tetragonal prism ball transfer cube (BTC) and the rectangular grating into which it may be inserted;

FIG. 6C illustrates a pentagon shaped or pentagonal prism ball transfer cube (BTC) and the pentagonal grating into which it may be inserted; and FIG. 6D illustrates a hexagon shaped or hexagonal prism ball transfer cube (BTC) and the hexagonal grating into which it may be inserted.

DETAILED DESCRIPTION OF THE PREFERRED EMBODIMENT

FIG. 2 illustrates a plurality of ball transfer cubes (BTCs) 200 of the present invention and the grating 102. The BTCs and the grating 102 may be cuboid as illustrated or they may be other prismatic shapes such as those illustrated by FIGS. 6A–6D. The BTCs 200 may be inserted into any one of a plurality of holes 104 of the grating 102 without distorting the grating holes. The grating 102 is the surface over which various loads may be transferred. The grating 102 may be a ground flooring, a floor suspended in a warehouse, a floor within a cargo plane, a walkway, a parcel carrier, or any surface where a grating may be present. The grating 102 may be made of metal such as stainless steel, hot rolled or cold rolled steel, or made of a composite material such as fiberglass. The grating is usually one to two inches thick while the individual steel bar thickness may be one-quarter of an inch thick. A square grating may be made of two inch by two inch squares from center to center with the holes 104 being one and three-quarter inch by one and three-quarter inch squares. The BTCs 200 are typically symmetrically placed within a grating 102 approximately eight to ten inches from center to center. Because the shape of the BTC 200 conforms to the size and shape of the grating holes, BTCs may be inserted side by side in order to share the force applied by a load. FIG. 3 illustrates a load 300, such as a parcel or cargo container, being carried by BTCs 200 that are inserted into the grating 102.

FIG. 4 illustrates an exploded view of the components of the ball transfer cube (BTC) 200. From the top view, the BTC 200 is polygonal in shape, such as square, and is installed into the similarly shaped grating 102. The ball transfer cube 200 includes a circular cap 402, a main ball bearing 404, a number of small diameter ball bearings 406, a cup-shaped race 408, and a hollow housing 410.

The housing 410 is somewhat hollow having a cavity within its body. The housing 410 has a lateral prismatic outer-surface 412 and two lateral cylindrical inner-surfaces 414 and 416 each having a diameter, a round mouth 418 at its top, a semi-spherical concave base 420 (see FIG. 5) at its bottom having a hole 422 near the nadir of the concave base, and a polygonal shaped shoulder 424 for supporting the BTC 200 within the grating.

The lateral prismatic outer-surface 412 is shaped to be inserted into the prismatic holes of a grating. For the square grating described above the lateral prismatic outer-surface 412 has the surface of a tetragonal prism. The base of the prism defining the outer-surface 412 may be defined by the grating hole 104 which may be approximately one and three-quarter inches by one and three-quarter inches square. The height of the prism defining the outer-surface 412 may vary depending upon the components used in the BTC 200 but may typically be one inch.

The polygonal shaped shoulder 424 starts at the top of lateral prismatic outer-surface 412. Near the center of the polygonal shaped shoulder 424 is the mouth 418 which is defined by the lateral cylindrical inner-surface 414. The base of the polygonal shoulder 424 is a surface that mates with the top surface of the grating 102 and is usually a flat surface. The corners of the polygonal shaped shoulder 424 are rounded as are the edges of the shoulder. At the top of the shoulder and surrounding the mouth 418, there is a small ring depression 430. Moving from the mouth 418 to the base of the shoulder, the top outer-surface of the shoulder tapers down to the base of the shoulder as illustrated in FIG. 5. The thickness of the shoulder varies but may typically be one-quarter inch thick near the mouth 418.

The diameter of the cylindrical hole defining the lateral cylindrical inner-surface 414 may vary depending upon the components used but it may typically be one and five-eighths inches. The height of the cylindrical hole defining the lateral cylindrical inner-surface 414 may vary as well but may typically be thirteen-thirty-seconds of an inch extending down into the cavity from the top of the housing. The diameter of the cylindrical hole defining the lateral inner-surface 416 may vary depending upon the components used but may typically be one and one-half inches. The height of the cylindrical hole defining the lateral cylindrical inner-surface 416 may vary as well but may typically be fifteen-thirty-seconds of an inch beginning where the surface 414 ends extending down into the cavity to the base 422. At the point where the lateral cylindrical inner-surface changes from 414 to 416, a circular ridge 428 is created when the diameter of the lateral cylindrical inner-surface 414 is larger than the diameter of the lateral cylindrical inner-surface 416. The circular ridge 428 assures that the cap 402 properly mates with the housing 410. The housing 410 also has a circular depression 430 near the middle of the lateral cylindrical inner-surface 414 for mating with the cap 402. The semi-spherical concave base 420 and the hole 422 of the housing 410 are not visible in FIG. 4 but are illustrated in FIG. 5.

The bearing race 408 is for the most part a spherical surface and sits inside the housing 410 against the semi-spherical concave base 420. The inner-surface and outer-surface of the race 408 starts out at the top of the race as a cylindrical ring 432 for approximately three sixteenths of an inch and then transitions into a spherical cap 434 of a spherical surface. The cylindrical ring 432 mates with the inner cylindrical surface 416. The round opening at the top of the race is approximately one and seven-sixteenths inches in diameter. The race 408 further has a relief hole 436 approximately one-sixteenth of an inch in diameter near the nadir of the spherical cap 434 in order to allow debris to escape out through the hole 422 in the housing 410.

The small diameter ball bearings 406 rest in a semi-spherical fashion in the race 408 such that each makes contact with the race 408 and do not overlap one another. The typical small ball bearings 406 may be approximately one-eight inch in diameter. The number of small ball bearings varies depending upon the surface area of the race 408 and the selected diameter of the main ball bearing 404. The main ball bearing 404 rests on top of the semi-spherical arrangement of small ball bearings 406 and protrudes through a hole 438 in the circular cap 402. The typical main ball bearing 404 may be approximately one and three-sixteenths inches in diameter.

The circular cap 402 is somewhat cylindrically shaped with a circular ridge 440 around its lateral cylindrical outer-surface, a spherical zone inner-surface, the circular hole 438 centered near the top that allows the main ball bearing 404 to be exposed, a circular shoulder 442 at its top edge, and a circular ring 444 as its base. The cap 402 encompasses the mouth 418 of the housing and snaps into place. The cap's circular ridge 440 mates with the circular depression 430 in the housing 410 when the BTC 200 is assembled. The circular ring 444 butts up against the circular ridge 428 of the housing 410 when assembled. The circular shoulder 442 butts up against the ring depression 430 when the BTC 200 is assembled and assists in keeping the cap in place. The cap 402 holds the race 408, the small ball bearings 406, and the main ball bearing 404 inside the cavity of the housing 410 while allowing the ball bearings 404 and 406 to roll freely.

FIG. 5 illustrates a cross-sectional view of an assembled BTC 200 inserted into the grating 102 with the load 300 riding on top of the main ball bearing 404. The prismatically shaped lateral prismatic outer-surface 412 is of a size such that the BTC 200 may be inserted into the corresponding holes 104 in the grating 102. The lateral prismatic outer-surface 412 is a prismatic shape from the base of the housing 410 up to the base of the shoulder 424. The polygonal shoulder 424 is wider than the lateral prismatic outer-surface 412. The interior of the housing 410 is hollow and has cylindrical sides 414 and 416 each having a diameter and the semi-spherical concave base 420 with the hole 422 near its nadir. At the top of the housing 410 is the polygonal shoulder 424 that rests on top of the grating 102 to keep the BTC 200 from sliding through the holes 104 in the grating. Also, the shoulder 424 must be strong in order to support the load placed upon the BTC 200.

In FIG. 5, the housing 410 has the hole 422 near the nadir of the semi-spherical concave base 420 such that dirt, debris, and liquids may escape out the bottom of the housing 410. When viewed from the bottom, the outer-surface of the base 420 appears to be a convex spherical zone of a spherical surface and the outer-surface of the hole 422 appear as a frustrum of a cone. The inner diameter of the hole 422 may be approximately three-eights of an inch while the outer diameter of the hole may be approximately one-half of an inch. When viewed from the top, the inner-surface of the base 420 appears to start from its edge as a ring surface and then becomes a concave spherical zone of a spherical surface having the hole 422 near its nadir. The semi-spherical bearing race 408 rests on the semi-spherical curved base 420 of the housing 410. Near the nadir of the bearing race 408 is the small relief hole 436 which is surrounded by the hole 422 in the housing 410. The small relief hole 436 allows liquids and small solid particles to escape from the bearing race 408 and may be approximately one-sixteenth of an inch in diameter. The small ball bearings 406 rest on top of the bearing race 408. The number of ball bearings 406 vary depending on the surface area of the bearing race 408 and the size of the main ball bearing 404. Main ball bearing 404 rests on top of the small ball bearings 406.

Referring to FIGS. 4 and 5, the lateral outer-surface of the cap 402 is cylindrical with the circular ridge 440 near the middle of the lateral cylindrical outer-surface. The small circular shoulder 442 is around the top edge of the cap 402. The inner-surface of the cap 402 is a spherical zone of a spherical surface with a radius that nearly matches the radius of the main ball bearing. The spherical zone of the spherical surface nearly rests on top of the main ball bearing 404 but has a small gap between the two components. The bottom of the cap 402 has a round opening approximately one and one-quarter inches in diameter that fits over the main ball bearing 404. The thickness of the circular ring 444 forming the base of the cap is approximately three-sixteenths of an inch. The main ball bearing 404 peaks through the top of the cap 402 through the central top hole 438 which is approximately fifteen-sixteenths of an inch in diameter. The top outer-surface of the cap 402 is a ring that starts off flat and then slightly bevels downward towards the outer lateral surface. The circular ridge 440 of the cap 402 mates into the circular depression 430 in the housing 410 when the BTC 200 is assembled. The circular shoulder 442 of the cap 402 mates into the small ring depression 430 in the shoulder 424 of the housing 410 when the BTC 200 is assembled. When assembled, the cap holds a group of new components together.

The shoulder 424 and the top of the cap 402 rise above the surface of the grating 102 when the BTC 200 is inserted. The main ball bearing 404 has a portion of its spherical shape protruding through the central hole 438 in the top of the cap such that the apex of the main ball bearing 404 rises further still above the surface of the grating 102. The load 300 may rest on the top of the main ball bearing 404 that peaks through the hole in the center of the cap 402. As the load 300 is moved, the main ball bearing 404 rolls in whatever direction the load is moved. The load 300 may be moved in any direction in the x-y orthogonal plane of the grating 102. The small ball bearings 406 roll under the main ball bearing 404 and circulate from back to front in the direction of the movement in the load 300.

The manufacture of a metallic ball transfer cube (BTC) 200 is somewhat analogous to the manufacture of a metallic ball transfer unit (BTU) 100. However the metal manufacturing of the housing 410 for the BTC 200 is significantly different than the metal manufacture of the housing 120 for the BTU. The typical main ball bearing 404 may be approximately one and three-sixteenths inches in diameter and is generally made of stainless steel. The typical metallic small ball bearings 406 are approximately one-eight inch in diameter and have a Rockwell hardness of approximately 62. The metallic bearing race 408 is typically a four-twenty stainless steel that has been treated with a specialized heat treating process. The metallic housing cap 402 and housing 410 may be made of stainless steel as well. The use of stainless steel in the manufacture of the metallic BTC 200 provides for improved lifetime due to the reduction of corrosion.

Alternatively the components of the BTC 200 can be made of a strong plastic such as a Delrin™ or Celcon™ plastic. In this case, cap 402, main ball bearing 404, small ball bearings 406, bearing race 408, and housing 410 may all be manufactured using the strong plastic. Otherwise a few selected components may be made of the strong plastic while other components remain being manufactured out of stainless steel. While a number of components may be cast in plastic molds; the housing 410, the cap 402, and other components of the BTC 200 may be preferably injection molded. However, the housing 410, the cap 402, and the other components of the BTC 200 may be machined from various materials.

Use of plastic is preferable because when a load is first dropped on top of the BTCs a spike loading occurs. Plastic being resilient absorbs the shock to the BTC 200 from the spike loading and preserves the integrity of the ball bearings 404 and 406. Furthermore, plastic components tend to be less noisy, noncorrosive, avoid rusting, and are less expensive than steel. Also, plastic components are less temperature sensitive and can be used more readily in outdoor applications, specifically in regions of colder climate. BTUs having plastic components are lighter than all metal BTUs and the plastic components can more readily be recycled. Also, a plastic component naturally resists corrosion thereby obviating a plating process that may be applied to the component.

FIG. 2 and FIGS. 6A–6B illustrate some of the possible polygonal shapes or prismatic holes that grating 102 and the outer lateral surface that housing 410 of the BTC 200 may have. FIG. 2 illustrates a square shaped or cuboid grating 102 into which the cuboid BTC 200 may be inserted. However, a BTC 200 may have a different prismatic shape in order that it may be inserted into other gratings. FIG. 6A illustrates a triangular shaped or trigonal prism grating 602 having trigonal prism holes 603. For such matting, the BTC 200 may be shaped into a trigonal prism body as illustrated by a BTC 604 in order that it may be inserted into the grating 602. The plastic housing 410 through the use of injection molds may be easily adapted to the other shapes for the external portions of the housing. FIG. 6B illustrates a rectangular shaped or tetragonal prism grating 605 having tetragonal prism holes 606. For such matting, the BTC may be shaped into a tetragonal prism as illustrated by a BTC 608 in order that it may be inserted into the grating 605. FIG. 6C illustrates a pentagonal shaped or pentagonal prism grating 609 having tetragonal prism holes 610. For such matting, the BTC may be shaped into a pentagonal prism as illustrated by a BTC 612 in order that it may be inserted into the grating 609. FIG. 6D illustrates a hexagonal shaped or hexagonal prism grating 613 having hexagonal prism holes 614. For such matting, the BTC may be shaped into a hexagonal prism as illustrated by a BTC 616 in order that it may be inserted into the grating 613. While the lateral outer-surface 412 of the BTC 200 inserted into the grating may take on one shape, the polygonal shoulder 424 may be of a different shape. For example, the shoulder 424 may be a square while the lateral outer-surface 412 may be a hexagonal prism or trigonal prism shape. As another example the shoulder 424 may be rectangular while the lateral prismatic outer-surface 412 may be a trigonal prism or pentagonal prism shape Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A ball transfer cube for insertion into a grating for conveying a load, comprising:

a hollow housing having a lateral prismatic outer-surface, a lateral cylindrical inner-surface, a polygonal shoulder coupled to said lateral prismatic outer-surface at a top of the hollow housing, a circular depression within said lateral cylindrical inner-surface near said top of the hollow housing, and a semi-spherical concave base with a first centralized hole;

a semi-spherical bearing race coupled to said semi-spherical concave base of tile hollow housing and having a second centralized hole;

a plurality of small ball bearings coupled to the semi-spherical bearing race;

a main ball bearing coupled to the plurality of small ball bearings; and a cylindrical cap having a third central opening for exposing the main ball bearing above a top surface of the cylindrical cap and a circular ridge around a lateral cylindrical outer-surface of the cylindrical cap coupled to said circular depression in the hollow housing for holding the main ball bearing, the plurality of small ball bearings, and the semi-spherical bearing race within the hollow housing.

2. The ball transfer cube of claim 1 wherein the hollow housing has a trigonal lateral prismatic outer-surface.

3. The ball transfer cube of claim 1 wherein the hollow housing has a tetragonal lateral prismatic outer-surface.

4. The ball transfer cube of claim 1 wherein the hollow housing has a pentagonal lateral prismatic outer-surface.

5. The ball transfer cube of claim 1 wherein the hollow housing has a hexagonal lateral prismatic outer-surface.

6. The ball transfer cube of claim 1 wherein the hollow housing has a septagonal lateral prismatic outer-surface.

7. The ball transfer cube of claim 3 wherein said polygonal shoulder of the hollow housing is a square shoulder.

8. The ball transfer cube of claim 3 wherein said polygonal shoulder of the hollow housing is a rectangular shoulder.

9. The ball transfer cube of claim 4 wherein said polygonal shoulder of the hollow housing is a pentagonal shoulder.

10. The ball transfer cube of claim 5 wherein said polygonal shoulder of the hollow housing is a hexagonal shoulder.

11. The ball transfer cube of claim 6 wherein said polygonal shoulder of the hollow housing is a septagonal shoulder.

12. The ball transfer cube of claim 1 wherein any one of the hollow housing, the semi-spherical bearing race, the plurality of small ball bearings, the main ball bearing, or the cylindrical cap is composed of a strong plastic.

13. The ball transfer cube of claim 1 wherein the hollow housing and the cylindrical cap are composed of a strong plastic.

14. The ball transfer cube of claim 13 wherein the semi-spherical bearing race, the plurality of small ball bearings, and the main ball bearing are composed of a strong plastic.

15. A ball transfer grating for conveying a load, comprising:

a grating having a plurality of prismatic openings; and a ball transfer cube for insertion into one of said plurality of prismatic openings in the grating.

16. The ball transfer grating of claim 15 wherein the grating is composed of fiberglass bars.

17. The ball transfer grating of claim 15 wherein the grating is composed of steel bars.

18. The ball transfer grating of claim 15 wherein the grating is a triangular shaped grating having trigonal prism openings and the ball transfer cube is a trigonal prism shaped ball transfer cube.

19. The ball transfer grating of claim 15 wherein the grating is a square shaped grating having cuboid openings and the ball transfer cube is a cuboid shaped ball transfer cube.

20. The ball transfer grating of claim 15 wherein the grating is a rectangular shaped grating having tetragonal prism openings and the ball transfer cube is a tetragonal prism shaped ball transfer cube.

21. The ball transfer grating of claim 15 wherein the grating is a pentagonal shaped grating having pentagonal prism openings and the ball transfer cube is a pentagonal prism shaped ball transfer cube.

22. The ball transfer grating of claim 15 wherein the grating is a hexagonal shaped grating having hexagonal prism openings and the ball transfer cube is a hexagonal prism shaped ball transfer cube.

23. The ball transfer grating of claim 15 wherein the ball transfer cube further comprises:

a hollow housing having a lateral prismatic outer-surface, a lateral cylindrical inner-surface, a polygonal shoulder coupled to said lateral prismatic outer-surface at a top of the hollow housing, a circular depression within said lateral cylindrical inner-surface near said top of the hollow housing, and a semi-spherical concave base with a first centralized hole;

a semi-spherical bearing race coupled to said semi-spherical concave base of the hollow housing and having a second centralized hole;

a plurality of small ball bearings coupled to the semi-spherical bearing race;

a main ball bearing coupled to the plurality of small ball bearings; and a cylindrical cap having a third central opening for exposing the main ball bearing above a top surface of the cylindrical cap and a circular ridge around a lateral cylindrical outer-surface of the cylindrical cap coupled to said circular depression in the hollow housing for holding the main ball bearing, the plurality of small ball bearings, and the semi-spherical bearing race within the hollow housing.

24. The ball transfer grating of claim 23 wherein any one of the hollow housing, the semi-spherical bearing race, the plurality of small ball bearings, the main ball bearing, or the cylindrical cap of the ball transfer cube is composed of a strong plastic.

* * * * *